E. WESTON.
Dynamo Electric Machines.

No. 201,968. Patented April 2, 1878.

E. WESTON.
Dynamo Electric Machines.

No. 201,968. Patented April 2, 1878.

E. WESTON.
Dynamo Electric Machines.

No. 201,968.  Patented April 2, 1878.

UNITED STATES PATENT OFFICE.

EDWARD WESTON, OF NEWARK, NEW JERSEY, ASSIGNOR TO WESTON DYNAMO ELECTRIC MACHINE COMPANY, OF SAME PLACE.

IMPROVEMENT IN DYNAMO-ELECTRIC MACHINES.

Specification forming part of Letters Patent No. 201,968, dated April 2, 1878; application filed March 4, 1878.

*To all whom it may concern:*

Be it known that I, EDWARD WESTON, of Newark, New Jersey, have invented certain Improvements in Dynamo-Electric Machines, of which the following is a specification:

My improvements relate to that class of dynamo-electric machines in which electrical impulses from several adjoining coils are conducted into the operating circuit at the same time, and the decrement in the strength of an impulse from one coil is compensated for by a corresponding increment in the strength of an impulse from another coil, whereby the operative circuit is supplied with a current which is continuous, and which is of nearly uniform electromotive force.

My present invention consists, broadly, in wholly or partially inclosing a rotating magnet with a stationary coil or coils.

Secondly, my invention consists in a magnet mounted and rotating upon its neutral axis, and arranged in close proximity with a coil a portion of which occupies a plane parallel with the plane of rotation of the magnet, whereby the whole of the magnet, from its axis to its poles, is actively employed in the production of the current, and in its rotation cuts all the lines of magnetic force at substantially right angles.

The third feature of my invention consists in the employment of a skeleton-frame, of non-magnetic material, for supporting the coils, whereby the magnet is brought into close proximity with the inner surfaces of the coils, and whereby the resistance to the rotation of the magnet is diminished.

Fourthly, my invention includes the feature of a hollow iron cylinder, which surrounds the coils and increases the inductive effect upon them of the rotating magnet, and also affords a support for the skeleton-frame, upon which the coils are wound.

In the accompanying drawings, illustrating a machine embodying my improvements, the coils are wound in separate groups, traversing the exterior of a skeleton cylindrical frame, in the center of which is the rotating shaft, upon which the magnet is mounted. In this case, portions of the coils occupy planes on both sides of the magnet parallel to the plane of its rotation, and the magnet is, therefore, wholly inclosed by the coils.

I prefer to make the rotating magnet an electro-magnet, although my invention is present when a permanent magnet is employed in the same relation to the stationary coils.

Figure 1:
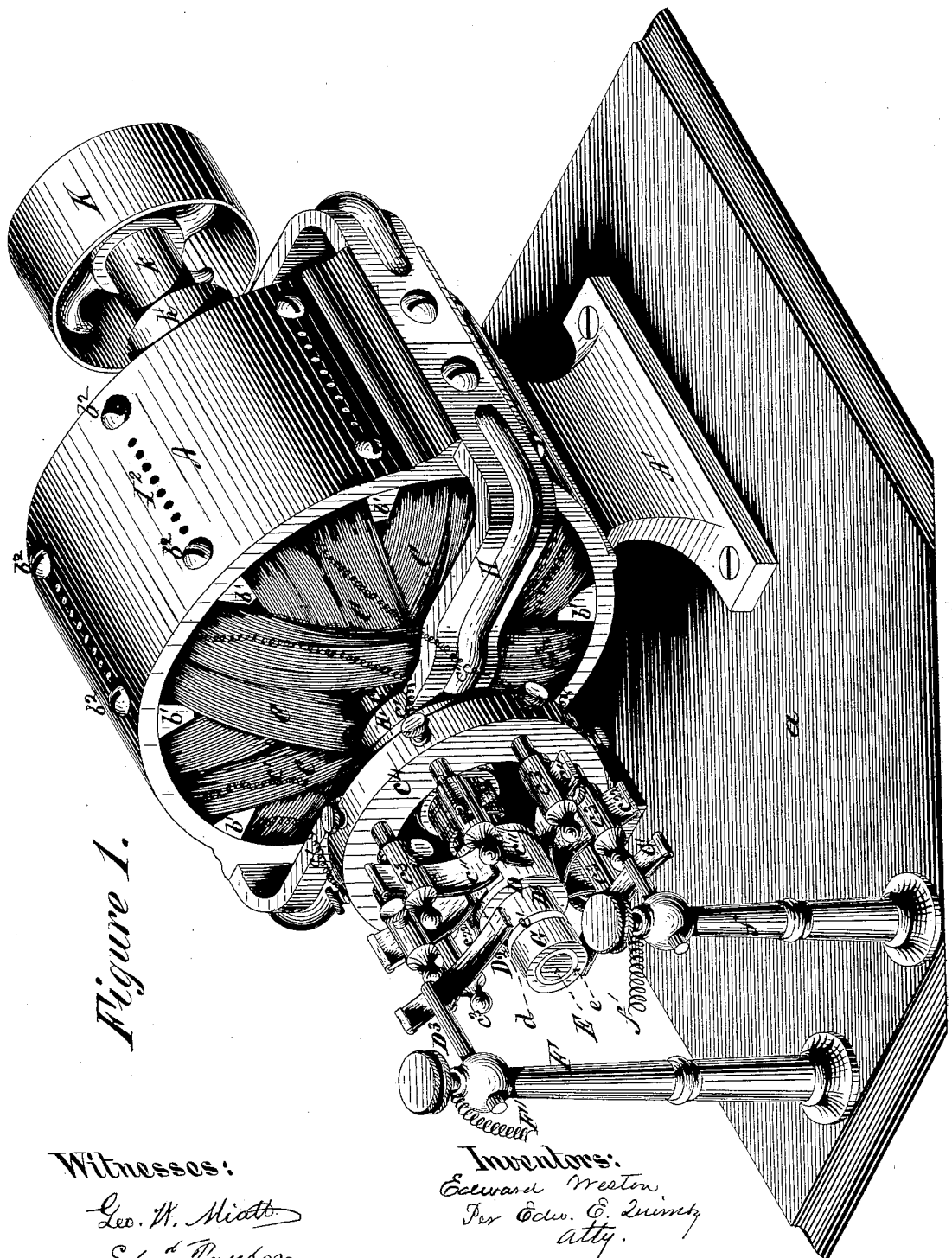
Figure 2:
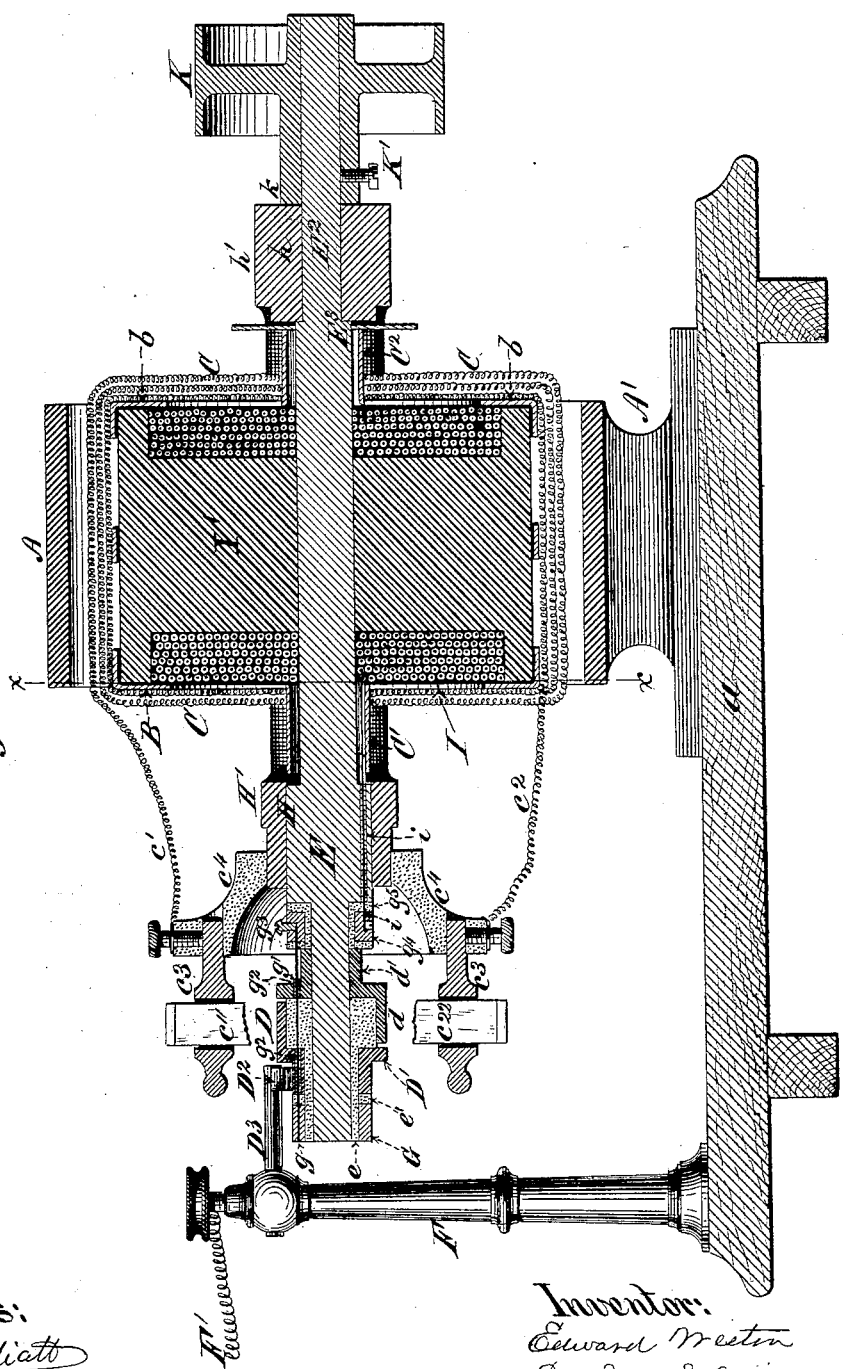
Figure 3:
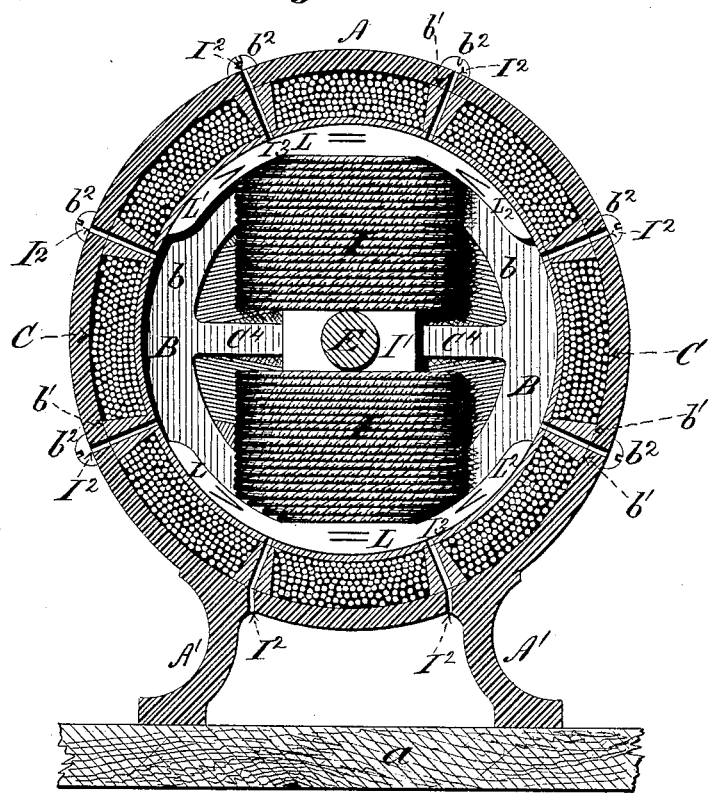
Figure 4:
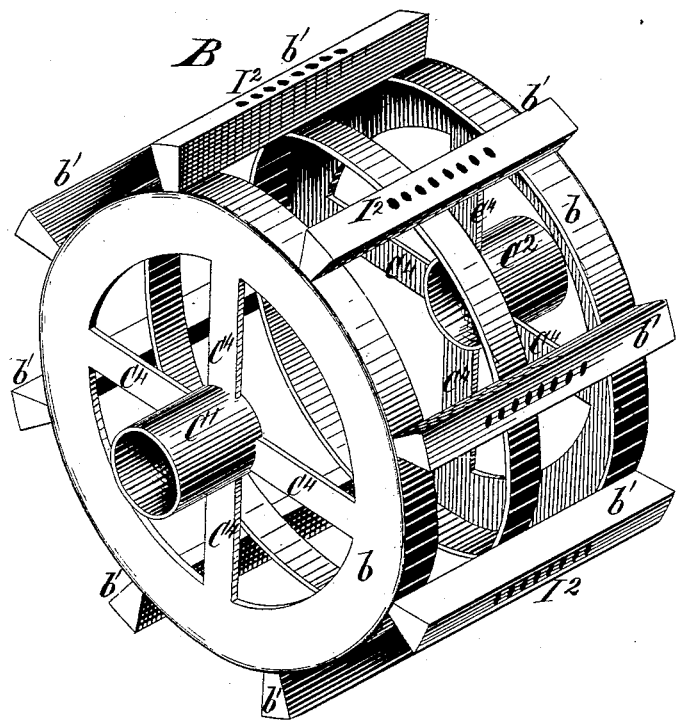

In the drawings, Figure 1 is an isometrical perspective of the machine. Fig. 2 is a central longitudinal vertical section. Fig. 3 is a transverse section through the line $x\ x$ on Fig. 2. Fig. 4 is an isometrical perspective of the skeleton-frame, upon which the coils are wound.

Referring to the drawings, it will be seen that the cylindrical iron shell A, open at the ends, is provided with foot-pieces A', by means of which it is secured to the bed-plate $a$. Within the cylinder A is a skeleton-frame, B, consisting of two or more rings, $b\ b$, joined together by the equidistant strips or ribs $b^1$, which are parallel with the axis of the cylinder, and which serve to divide the rings into eight equal segments. The outermost surfaces of the ribs $b^1$ are curved transversely to fit the interior surface of the shell A, to which they are fastened by the screws $b^2$. The number of ribs, and, consequently, the number of segments, into which the skeleton-frame is divided will depend, of course, upon the size of the machine, and may be varied at the will of the constructor.

In the drawing, the skeleton-frame is shown to be divided into eight segments, and each pair of diametrically-opposite segments serves to support one of the four coils, C. Each coil traverses the entire exterior of the skeleton-frame, extending across the ends of the cylinder, from the segment on one side to the segment diametrically opposite, and the free ends $c^1$ and $c^2$ of the coil are, respectively, connected with two stationary brushes, $c^{11}$ and $c^{22}$, bearing upon diametrically-opposite sides of the cylindrical commutator D $d$.

This mode of winding and connecting each coil is shown in Fig. 2, whereon, for the sake of avoiding confusion, only one of the four coils is represented. The eight brushes required for connection with the free ends of the four coils are secured in the slotted stems $c^3$, projecting laterally from the face of the annular cup-shaped disk $c^4$, of insulating material, which is supported upon the cross-bar H.

The commutator is composed of the two concentrically-curved strips D d, which project laterally in opposite directions from the opposed faces of the hubs $D^1$ $d'$. The hub $d'$ is secured directly upon the rotating shaft E, while the hub $D^1$ is mounted on a bushing, which insulates it from the shaft E. The two curved strips D d overlap each other upon opposite sides of the shaft, and the two spaces between their edges are filled with wood, in order to provide a continuous concentrically-curved path for the brushes $c^{11}$ and $c^{22}$, not less than three of which are always in contact with each strip. The hub $D^1$ is elongated sufficiently to provide a bearing for the brush $D^2$, which is supported in the stem $D^3$, projecting laterally from one of the binding-posts F, with which one end, F', of the operative part of the circuit is connected.

Outside the hub $D^1$ is a metallic collar, G, mounted upon an insulating-bushing, e, upon the shaft E, and separated from the hub $D^1$ by the insulating-collar e'. The other binding-post, f, of the machine, to which the other end, f', of the operative circuit is connected, is provided with a brush, G', which bears upon the periphery of the collar G. The inner face of the collar G is connected with the wire g, which is inclosed in a tube of insulating material, $g^1$, inserted in holes $g^2$ extending through the hubs $D^1$ and $d'$. The inner end of the wire g is secured, by a set-screw, $g^3$, to a metallic collar, $g^4$, which is separated from the shaft E by the flanged insulating-bushing $g^5$.

The bearings H h for the shaft E are formed in the arms H' h', which extend horizontally across each end of the cylinder, and are bolted thereto. The shaft E has, at the front end of the cylinder, an enlarged journal, which is longitudinally perforated to receive the insulating-tube i, containing the wire i', which, at its forward end, is secured to the collar $g^4$, and serves to connect that collar with one end of the system of coils I surrounding the iron core $I^1$ of an electro-magnet mounted upon and revolving with the shaft E. The opposite end of the system of coils I is connected to the iron core of the rotating magnet, and hence, through the core and shaft E, with the commutator-hub $d'$, and successively with the brushes connected with the ends of the stationary coils.

It will be seen that if a permanent magnet be substituted for the electro-magnet upon the shaft E, there will be no necessity for the system of connections by which the coil surrounding the electro-magnet is brought into circuit with the stationary coils, and that it will only be necessary to connect the collar G with the shaft E in order to complete the circuit.

The shaft E is prevented from longitudinal movement by the journal $E^2$ at the rear end of the cylinder. The shoulder $E^3$ on the shaft holds it in one direction, and it is held in the other direction by the hub k of the driving-pulley K, which is secured to the rear end of the shaft E by the set-screw K'. Those portions of the stationary coils which cross the ends of the cylinder are prevented from coming in contact with the shaft E by the tubes $C^1$ and $C^2$ of insulating material, which are respectively held in position by means of radial arms $C^4$, extending outward and secured to the skeleton-frame.

The poles $I^3$ of the rotating magnet are concentrically curved, describing an arc of a circle nearly equal in length to the arc described by the inner surface of three of the segments. It will thus be seen that there is constant inductive action by the rotating magnet upon not less than three of the coils. In the middle coil of the three the electrical impulse may be said to be at its maximum strength, as indicated by the parallel lines L in Fig. 3. In the adjoining coil on the left the electrical impulse is decreasing in strength, as indicated by the converging lines $L^1$, and in the right-hand coil the impulse is increasing in strength, as indicated by the diverging lines $L^2$.

By enlarging the size of the machine, and the number of segments into which the skeleton-frame is divided, the rotating magnet may be made to act simultaneously upon a correspondingly larger number of coils, the mode of operation being the same in respect of the simultaneous communication to the main circuit of electrical impulses from several adjoining coils.

The effectiveness of the machine is greatly increased by having the coils traverse the whole exterior of the skeleton-frame and pass across the ends in planes parallel to the plane of rotation of the magnet in close proximity to the sides of the magnet; but the machine will be operative if this proximity is not preserved. It is also to be remarked that there are various modes of winding the stationary coils, and that in its broad aspect my invention consists in rotating a magnet in close proximity with stationary coils, however wound, in contradistinction to that class of machines in which the magnet rotates in close proximity with the poles of a stationary electro-magnet. In other words, in my invention the rotating magnet acts directly upon the stationary coils, instead of acting upon the ends of an iron core surrounded by coils.

The construction of the skeleton-frame is shown in isometrical perspective in Fig. 4. This frame is preferably made of a non-magnetic material.

By the rotation of the magnet air is drawn into the space within the coils through the openings between the shaft E and the tubes $C^1$ and $C^2$. The air so drawn in is thrown outward by the rotating magnet through the interstices between the coils and the ribs, and through the holes $I^2$ in the ribs and shell A, and thus tends to keep the machine cool.

I claim as my invention—

1. In a dynamo-electric machine, a system of stationary coils wound in cylindrical form, in combination with a rotating magnet inclosed within the coils, substantially as described.

2. A magnet rotating upon its neutral axis, in combination with a stationary coil, a portion of which is arranged in close proximity to the side of the magnet and parallel with the plane of rotation of the magnet, substantially as described.

3. A skeleton-frame adapted to support a system of stationary coils in a dynamo-electric machine in close proximity with a rotating magnet, substantially as described.

4. A skeleton-frame adapted to support a system of stationary coils, in combination with a hollow cylindrical iron shell, exteriorly surrounding the coils, substantially as and for the purposes described.

5. A rotating magnet inclosed within a system of coils wound in the form of a cylinder upon a stationary frame, in combination with apertures in the ends of the cylinder for admitting air into the space within the coils, and apertures in the periphery of the cylinder for allowing the expulsion of such air, substantially as described.

6. Two or more coils wound in diametrically-separate divisions upon a stationary cylindrical support, and inclosing a rotating magnet and a system of concentrically-placed brushes respectively connected with the free ends of the coils, in combination with a commutator in two parts, one of which is electrically connected with one binding-post and the other electrically connected with the other binding-post, substantially as described.

7. A stationary coil or coils, the convolutions of which inclose a rotating electro-magnet the coil of which is in circuit with the stationary coil or coils, substantially as described.

EDWARD WESTON.

Witnesses:
M. L. ADAMS,
EDWD. PAYSON.